United States Patent
Takemura (10) Patent No.: US 6,520,887 B2
(45) Date of Patent: Feb. 18, 2003

(54) TOROIDAL-TYPE CONTINUOUSLY VARIABLE TRANSMISSION

(75) Inventor: Hiromichi Takemura, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/797,811

(22) Filed: Mar. 5, 2001

(65) Prior Publication Data
US 2001/0024992 A1 Sep. 27, 2001

(30) Foreign Application Priority Data
Mar. 3, 2000 (JP) ........................... 2000-059163

(51) Int. Cl.$^7$ ................................. F16H 15/38
(52) U.S. Cl. ............................. 476/40; 476/46
(58) Field of Search .................... 476/46, 40, 42

(56) References Cited

U.S. PATENT DOCUMENTS

| | | | | |
|---|---|---|---|---|
| 5,380,256 A | * | 1/1995 | Fukushima | 476/40 |
| 5,823,911 A | * | 10/1998 | Hibi | 476/40 |
| 5,830,103 A | * | 11/1998 | Itoh et al. | 476/40 |
| 6,152,849 A | * | 11/2000 | Mori et al. | 476/40 |
| 6,174,258 B1 | * | 1/2001 | Imanishi et al. | 476/40 |

FOREIGN PATENT DOCUMENTS

| | | | | |
|---|---|---|---|---|
| JP | 9-133193 | | 5/1997 | ........ F16H/15/38 |
| JP | 10-331936 | | 12/1998 | ........ F16H/15/38 |
| JP | 11-132302 | | 5/1999 | ........ F16H/15/38 |
| JP | 2000-170862 A | * | 6/2000 | |

* cited by examiner

Primary Examiner—Jack Lavinder
Assistant Examiner—Mariano Sy
(74) Attorney, Agent, or Firm—Sughrue Mion, PLLC

(57) ABSTRACT

A toroidal-type continuously variable transmission in which a section area of a support plate portion (7) forming a trunnion (6) is expressed as S, the length thereof is expressed as L, and the section coefficient thereof is expressed as Z, the ratio (S×L)/Z is specified in the range of 10–35 and, more preferably, in the range of 15–30. This can make even the load distribution of balls forming the thrust ball bearing.

4 Claims, 7 Drawing Sheets

28: OUTER RACE
6: TRUNNION
7: SUPPORT PLATE PORTION

TOROIDAL-TYPE CONTINUOUSLY VARIABLE TRANSMISSION

BACKGROUND OF THE INVENTION

1. Field of the Invention

The present invention relates to a toroidal-type continuously variable transmission which is used as a transmission unit in an automatic transmission for a car or as a transmission for various kinds of industrial machines.

2. Description of the Related Art

Figure 3:
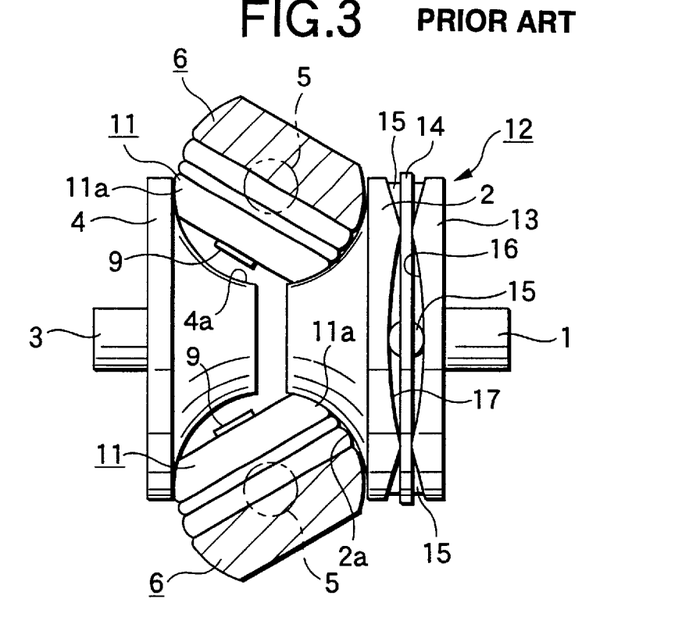
FIG. 3 is a side view of the basic structure of a conventional toroidal-type continuously variable transmission, showing a state thereof in which it is held in the maximum deceleration thereof.
Figure 4:
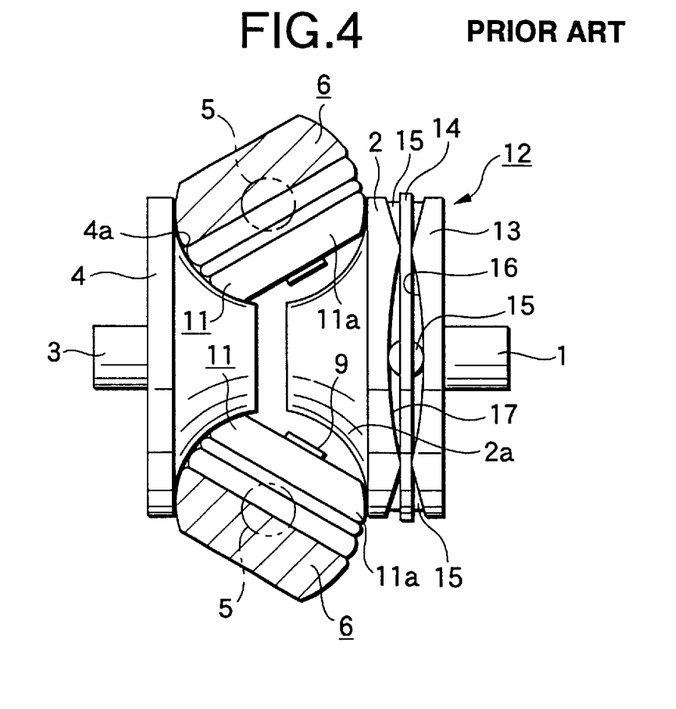
FIG. 4 is a side view of the above structure, showing a state thereof in which it is held in the maximum acceleration thereof.

As a transmission for a car, in some cases, there is used such a toroidal-type continuously variable transmission as shown in FIGS. 3 and 4. In this toroidal-type continuously variable transmission, for example, as disclosed in Japanese Unexamined Utility model Publication No. Sho. 62-71465 (JP-62-71465U), an input side disk 2 serving as a first disk is supported concentrically with an input shaft 1 and, to the end portion of an output shaft 3 which is disposed concentrically with the input shaft 1, there is fixed an output side disk 4 which is used as a second disk. In the interior portion of a casing in which the toroidal-type continuously variable transmission is stored, there are disposed trunnions 6, 6 which can be respectively swung about their associated pivot shafts 5, 5, while the pivot shafts 5, 5 are arranged at positions which are twisted with respect to the input and output shafts 1 and 3.

Figure 5:
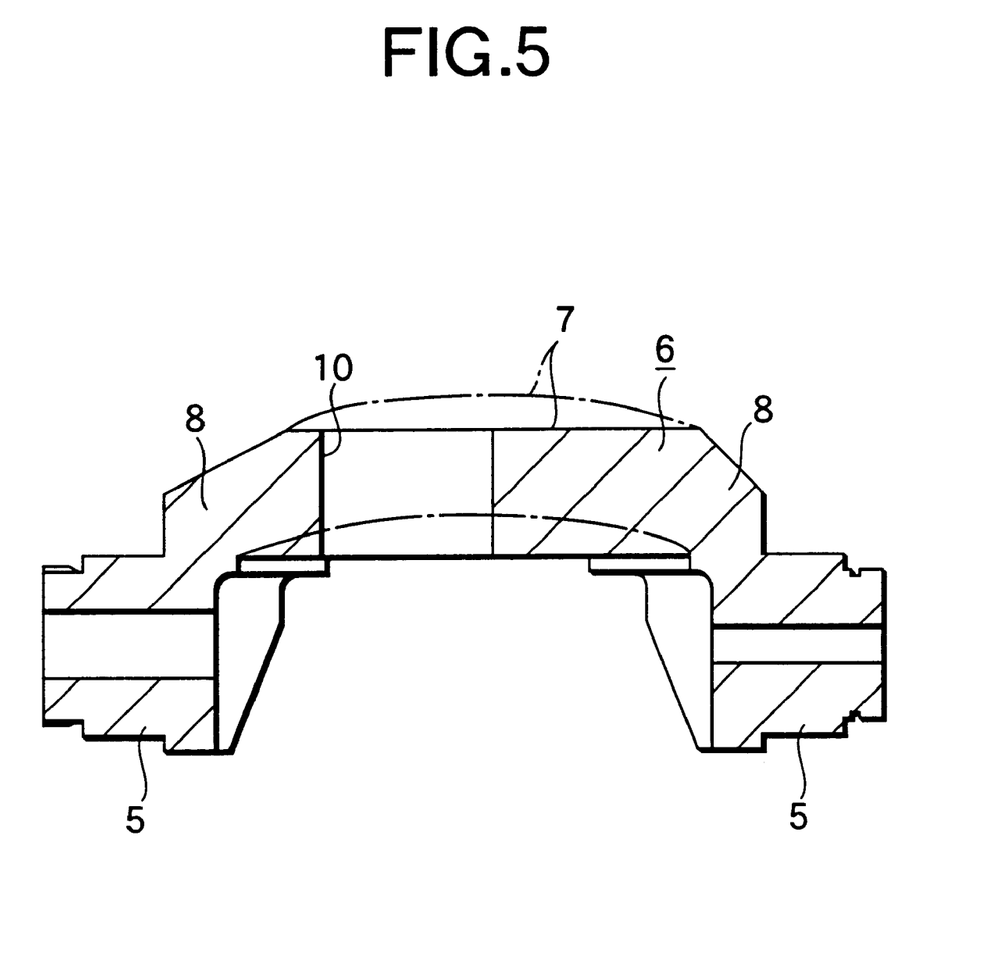
FIG. 5 is a section view of a concrete shape of the trunnion.

That is, each trunnion 6 includes a support plate portion 7 and, as shown in FIG. 5, in the two end portions of the support plate portion 7 in the longitudinal direction thereof (in FIG. 5, in the right and left direction), there are formed a pair of bent wall portions 8, 8 in such a manner that they are bent toward the inner surface side (in FIG. 5, the lower side) of the support plate portion 7. And, the pivot shafts 5, 5 are respectively disposed on the outer surfaces of the bent wall portions 8, 8 (the surfaces of the bent wall portions 8, 8 that are present on the opposite side to the support plate portion 7) in such a manner that the pivot shafts 5, 5 are concentric with each other. Also, in the intermediate portion of the support plate portion 7, there is formed a circular hole 10 which is used to support the base half portion of a shift shaft 9 to be discussed below.

In the circular hole 10 formed in the intermediate portion of the support plate portion 7 which forms each trunnion 6 having the above structure, there is supported the base half portion of the shift shaft 9. And, by swinging the respective trunnions 6, 6 about their associated pivot shafts 5, 5 as a center, the inclination angles of the shift shafts 9 supported in the intermediate portions of the trunnions 6, 6 can be adjusted. Also, on the shift shafts 9 with their respective base half portions supported in their associated trunnions 6, 6, specifically, on the peripheries of the leading half portions of the shift shafts 9 that are projected from the inner surfaces of the trunnions 6, 6, there are supported power rollers 11 in such a manner that they can be rotated. And, the power rollers 11 are held by and between the input side and output side disks 2, 4.

The input side and output side disks 2, 4 respectively include inner surfaces 2a, 4a which are opposed to each other; and, the section of each of the inner surfaces 2a, 4a is formed as a concave surface which can be obtained by rotating an arc with the pivot shaft 5 as a center thereof or a curved line close to such arc. And, the peripheral surface 11a, 11a, each of which is formed as a spherically convex-shaped surface, of the power rollers 11, 11 are contacted with the inner surfaces 2a, 4a, respectively.

Between the input shaft 1 and input side disk 2, there is interposed a pressure device 12 of a loading cam type; and, the input side disk 2 is elastically pushed toward the outside disk 4 by the pressure device 12. The pressure device 12 is composed of a cam plate 13 rotatable together with the input shaft 1, and a plurality of (for example, four) rollers 15, 15 respectively held by a retainer 14. And, on one side surface (in FIGS. 3 and 4, the left side surface) of the cam plate 13, there is formed a cam surface 16 consisting of an uneven (concave- and convex-shaped) surface which extends in the circumferential direction of the cam plate 13; and, on the outer surface (in FIGS. 3 and 4, the right side surface) of the input disk 2 as well, there is formed a similar cam surface 17. Also, the plurality of rollers 15, 15 are supported in such a manner that they can be rotated about their respective axes which extend in the radial direction with respect to the center of the input shaft 1.

When the above-structured toroidal-type continuously variable transmission is in use, in case where the cam plate 13 is rotated as the input shaft 1 is rotated, the cam surface 16 presses the plurality of rollers 15, 15 against the cam surface 17 formed on the outer surface of the input side disk 2. As a result of this, not only the input side disk 2 is pressed against the plurality of power rollers 11, 11 but also, due to mutual pressure contact between the pair of cam surface 16, 17 and the plurality of rollers 15, 15, the input side disk 2 is rotated. And, the rotational movement of the input side disk 2 is transmitted through the power rollers 11, 11 to the output side disk 4, thereby rotating the output shaft 3 which is fixed to the output side disk 4.

Now, the rotation speeds of the input and output shafts 1 and 3 can be changed in two manners. Firstly, to carry out deceleration between the input and output shafts 1 and 3, the trunnions 6, 6 may be respectively swung about their associated pivot shafts 5, 5 to thereby incline the respective shift shafts 9, 9 in such a manner that, as shown in FIG. 3, the peripheral surfaces 11a, 11a of the power rollers 11, 11 can be respectively contacted with the near-center portion of the inner surface 2a of the input side disk 2 and the near-outer-periphery portion of the inner surface 4a of the output side disk 4.

On the other hand, to carry out acceleration between the input and output shafts 1 and 3, the trunnions 6, 6 may be respectively swung about to thereby incline the respective shift shafts 9, 9 in such a manner that, as shown in FIG. 4, the peripheral surfaces 11a, 11a of the power rollers 11, 11 can be respectively contacted with the near-outer-periphery portion of the inner surface 2a of the input side disk 2 and the near-center portion of the inner surface 4a of the output side disk 4. By the way, in case where the inclination angles of the shift shafts 9, 9 are set between the angles shown in FIGS. 3 and 4, an intermediate transmission ratio can be obtained between the input and output shafts 1 and 3.

Figure 6:
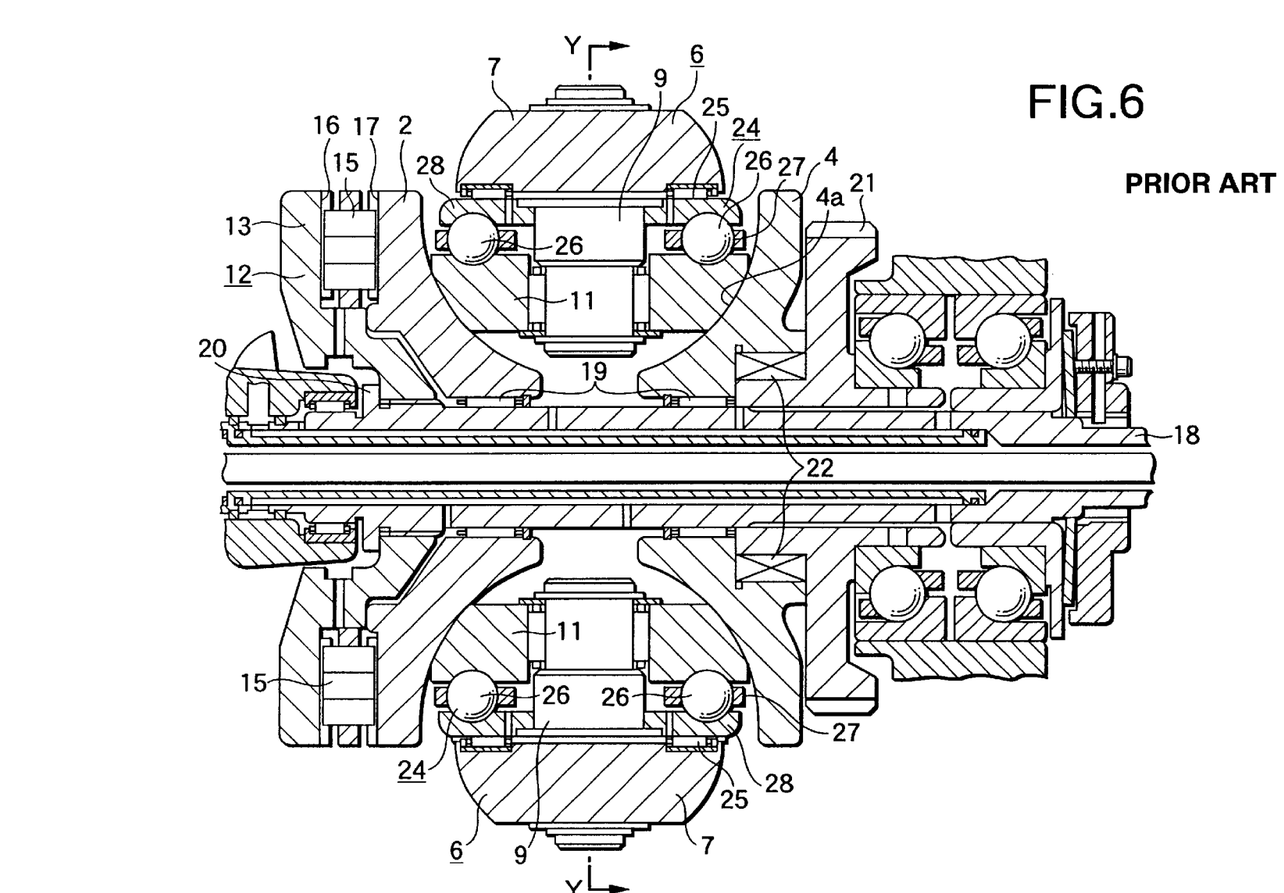
FIG. 6 is a section view of an example of a conventional structure.
Figure 7:
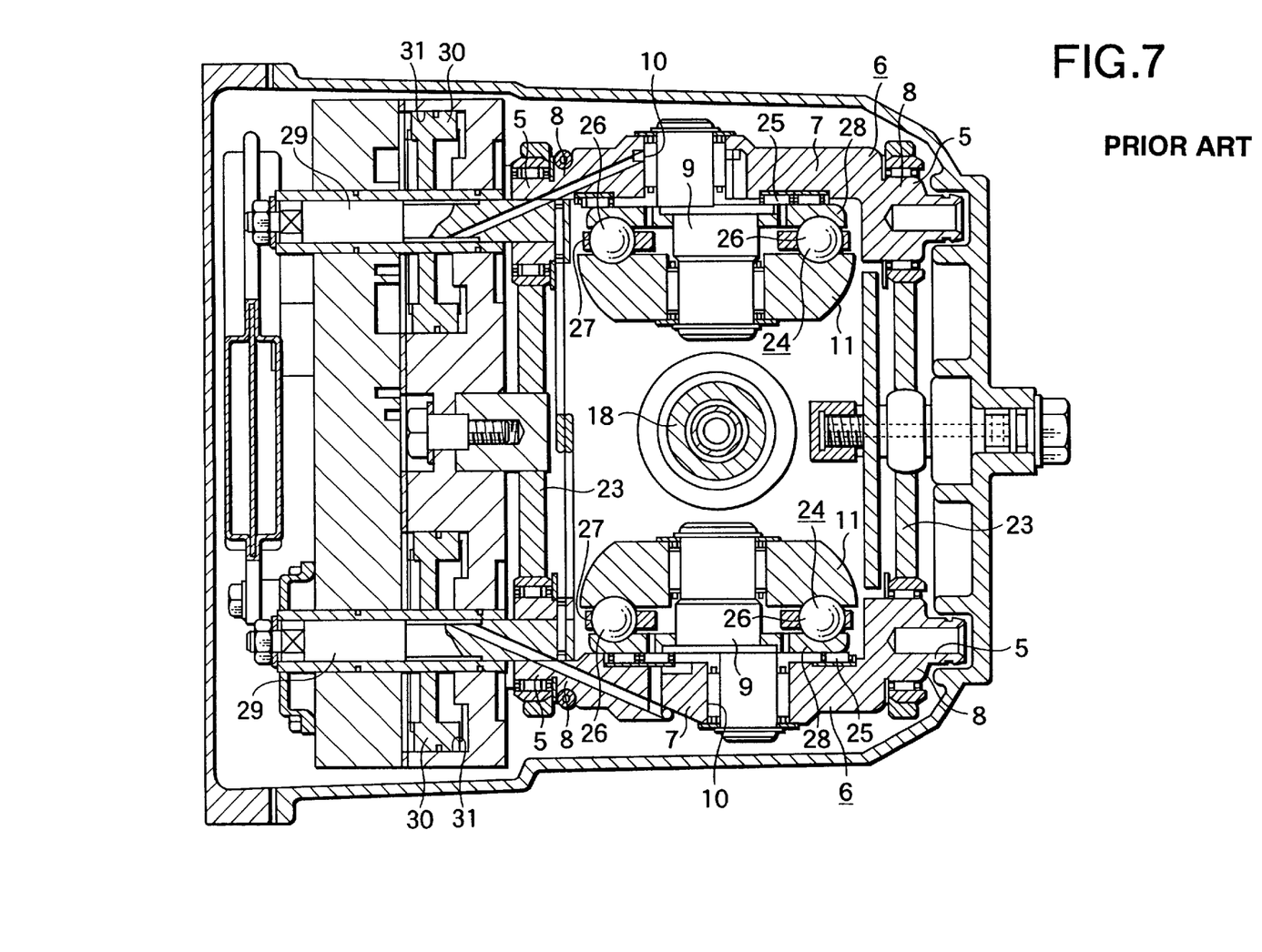
FIG. 7 is a section view taken along the line Y—Y shown in FIG. 6.

Further, FIGS. 6 and 7 respectively show a more specific conventional toroidal-type continuously variable transmission which is disclosed in Japanese Utility Model Unexamined publication No. Hei 1-173552 (JP-1-173552U) that is filed and stored in a microfilm. In this transmission, input side and output side disks 2 and 4 are supported respectively through their associated needle roller bearings 19 and 19 on the periphery of a circular-pipe-shaped input shaft 18 in such a manner that they can be rotated as well as can be shifted in the axial direction thereof. Also, a cam plate 13, which is used to form a pressure device 12 of a loading cam type, is spline-engaged with the outer peripheral surface of the end portion (in FIG. 6, the left end portion) of the input shaft 18; and, a collar portion 20 prevents the cam plate 13 from moving in a direction to part away from the input side disk 2. Further, an output gear 21 is connected to the output side disk 4 by keys 22 and 22, so that the output side disk 4 and output gear 21 can be rotated in synchronization with each other.

The two end portions of a pair of trunnions 6 and 6, each of which has such a structure as shown in FIGS. 3–5, are respectively supported on a pair of support plates 7 and 7 in such a manner that they can be swung as well as can be shifted in the axial direction thereof (in FIG. 6, in the front and back direction; and, in FIG. 7, in the right and left direction). And, there are further disposed a pair of shift shafts 9 each including a base half portion and a leading half portion which are formed in such a manner that they are parallel but eccentric with respect to each other. The base half section of each shift shaft 9 is rotatably supported in a circular hole 10 portion formed in the intermediate portion of each of two support plate portions 7 and 7 which respectively form their associated trunnions 6 and 6. Also, in the peripheries of the leading half portions of the shift shafts 9 that project from the inner surfaces of the support plate portions 7, there are respectively supported power rollers 11 in such a manner that they can be rotated.

By the way, the pair of shift shafts 9 and 9 respectively disposed on the pair of trunnions 6 and 6 are located at positions which are present on the 180° opposite side with respect to the input shaft 18. Also, the directions, in which the leading half portions of the shift shafts 9 and 9 are eccentric with respect to the base half portions thereof, are set the same direction (in FIG. 7, the reversed right and left directions) with respect to the rotation direction of the input side and output side disks 2 and 4. Also, the eccentric direction is set as a direction extending almost at right angles to the arranging direction (axial direction) of the input shaft 18. Therefore, the power rollers 11 and 11 are supported in such a manner that they can be slightly shifted in the arranging direction of the input shaft 18. As a result of this, even in case where the power rollers 11 and 11 are caused to shift in the axial direction of the input shaft 18 because the component members are elastically deformed due to the thrust load that is generated by the pressure device 12, the shifting amounts of the power rollers can be absorbed without applying an unreasonable force to the respective component members.

Also, between the outer surfaces of the power rollers 11, 11 and the inner surfaces of the intermediate portions of the support plate portions 7 forming the trunnions 6, 6, there are disposed thrust ball bearings 24, which are thrust rolling bearings, and thrust needle roller bearings 25 in the order that starts from the outer surfaces of the power rollers 11. Of the two kinds of bearings, the thrust ball bearings 24 carry the thrust-direction loads that are applied to the power rollers 11 as well as permit the rotating motion of the power rollers 11. Each of the thrust ball bearings 24 is composed of a plurality of balls 26, 26, a circular-ring-shaped retainer 27 for holding these balls 26, 26 in such a manner that the balls 26, 26 can be rotated, and a circular-ring-shaped outer race 28. Also, the inner race raceway of each thrust ball bearing 24 is formed on the outer surface of the power roller 11, whereas the outer race raceway thereof is formed on the inner surface of each outer race 28.

Also, the thrust needle roller bearings 25 are held by and between the inner surfaces of the support plate portions 7 forming the trunnions 6, 6 and the outer surfaces of the outer races 28, respectively. The thus structured thrust needle roller bearings 25, while carrying the thrust loads that are applied to the outer races 28 from the power rollers 11, permit the power rollers 11 and outer races 28 to swing and shift about the base half portions of their associated shift shafts 9.

Further, two drive rods 29 are respectively coupled to the one-side end portions (in FIG. 7, the left end portions) of their associated trunnions 6, 6; and, two drive pistons 30 are respectively fixed to the outer peripheral surfaces of the intermediate portions of the drive rods 29. And, the drive pistons 30 are fitted into their associated drive cylinders 31 in an oil-tight manner.

In the case of the above-structured toroidal-type continuously variable transmission, the rotational movement of the input shaft 18 is transmitted through the pressure device 12 to the input side disk 2. And, the rotation of the input side disk 2 is transmitted through the pair of power rollers 11 and 11 to the output side disk 4, while the rotation of the output side disk 4 is then taken out by the output gear 21.

To change a rotation speed ratio between the input shaft 18 and output gear 21, the pair of drive pistons 30 and 30 may be shifted in the mutually opposite directions. As the drive pistons 30 are shifted, the pair of trunnions 6 and 6 are shifted in the mutually opposite directions, whereby, for example, the power roller 11 shown on the lower side in FIG. 7 is shifted to the right in FIG. 7, whereas the power roller 11 shown on the upper side in FIG. 7 is shifted to the left in FIG. 7. This changes the direction of the tangential-direction force that is applied to the contact portions between the peripheral surfaces 11a, 11a of the power rollers 11, 11 and the inner surfaces 2a, 4a of the input side and output side disks 2, 4. And, as the direction of such tangential-direction force is changed, the trunnions 6, 6 are swung in the mutually opposite directions about their associated pivot shafts 5, 5 that are pivotally supported on their associated support plates 23, 23.

As a result of this, as has been previously shown in FIGS. 3 and 4, the contact positions between the peripheral surfaces 11a, 11a of the power rollers 11, 11 and the inner surfaces 2a, 4a of the input side and output side disks 2, 4 are changed, so that the rotation speed ratio between the input shaft 18 and output gear 21 is changed. In this manner, in case where a torque to be transmitted between the input shaft 18 and output gear 21 is caused to vary and the amounts of the elastic deformation of the respective component members are caused to vary, the power rollers 11, 11 and the outer races 28 attached to these power rollers 11 are slightly rotated about the base half portions of their associated shift shafts 9. Because the thrust needle roller bearings 25 are present between the outer surfaces of the outer races 28 and the inner surfaces of the support plate portions 7 forming the trunnions 6, the rotational movement of the power rollers 11 and outer races 28 can be carried out smoothly. This can reduce the force that is necessary to change the inclination angles of the shift shafts 9, 9.

When the above-structured toroidal-type continuously variable transmission is in operation, to the power rollers 11 that are rotatably supported on the inner surface side of their associated trunnions 6, 6, there are applied thrust loads from the inner surfaces 2a, 4a of the input side and output side disks 2, 4. And, the thrust loads are transmitted through the thrust ball bearings 24 and thrust needle roller bearings 25 to the inner surfaces of the support plate portions 7 respectively forming their associated trunnions 6. Therefore, when the toroidal-type continuously variable transmission is in operation, as exaggeratedly shown by chained lines in FIG. 5, the trunnions 6, 6 are elastically deformed, although slightly, in a direction where the inner surface sides thereof respectively provide concave-shaped surfaces.

And, in case where the amount of such elastic deformation increases, the thrust loads, which are applied to the balls 26, 26 used as the rolling bodies forming the thrust ball bearings 24 as well as to the needle rollers forming the thrust needle roller bearings 25, are made to vary unevenly. That is, as the result of the great elastic deformation of the trunnions 6, the distance between the inner surfaces of the trunnions 6 and the outer surfaces of the power rollers 11 are made to vary unevenly. This uneven variation in the distance decreases the thrust load to be applied to the rolling bodies existing in the portion where the distance between these inner and outer surfaces is increased, but it increases the thrust load to be applied to the rolling bodies existing in the portion where the distance between these inner and outer surfaces is decreased. As a result of this, an excessive thrust load is applied to the specific ones of the rolling bodies, which increases excessively the contact pressure between such specific rolling bodies and the raceways in contact with the rolling surfaces of such specific rolling bodies. This results in the extremely shortened fatigue lives of the specific rolling surfaces and the raceways in contact therewith.

Figure 8:
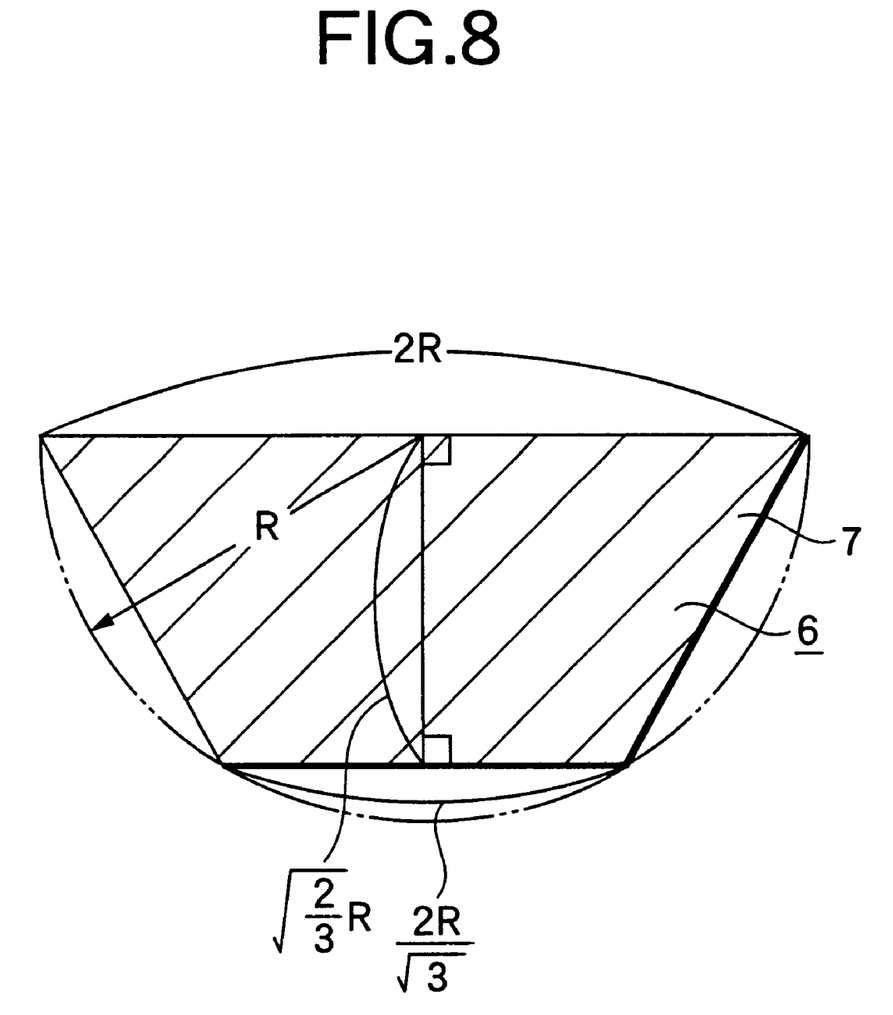
FIG. 8 is a section similar to FIG. 1(B), showing an example of a preferred section shape of the trunnion.

In order to prevent the shortened fatigue lives of the rolling surfaces of the specific rolling bodies and the raceways in contact therewith caused by the above excessive thrust load, in Japanese Patent Unexamined Publication No. Hei. 7-229546 (JP-A-7-229546), there is disclosed a technology in which, as shown in FIG. 8, the section shape of the support plate portion 7 forming the trunnion 6 is formed as an isosceles trapezoid where its inner surface side (in FIG. 8, upper side) is set as a long side and its outer surface side (in FIG. 8, lower side) is set as a short side. And, in case where the length dimension of the long side on the outer surface side is set as 2R, the length dimension of the short side on the inner surface side is set as $2 \times R/\sqrt{3}$ and the distance between the long and short sides, that is, the length of a line connecting these two sides is set as $\sqrt{(2/3)} \times R$.

In the case of the support plate portion 7 which has a section having an isosceles trapezoid shape, its section coefficient Z is $0.188 \times R^3$ and its section area S is $1.29 R^2$. And, a ratio of the section coefficient Z to the section area S, that is, Z/S is 0.146R. This numeric value (0.146R) is larger than a case where the section of a support plate portion has a semicircular or rectangular shape. Therefore, in the case of the support plate portion 7 having such a section shape as shown in FIG. 7, although its section area is relatively small, in other words, although the support plate portion 7 is relatively light in weight, there can be obtained a sufficient section coefficient, which makes it possible to realize a trunnion 6 which is large in bending rigidity.

The technology disclosed in the above-cited JP-7-229546U is advantageous in that the elastic deformation of the trunnion 6 can be controlled under the limited conditions. However, according to our further study, it has been found that the desired fatigue lives of the rolling surfaces and raceways cannot be always secured simply by reducing the amount of the elastic deformation of the trunnion 6.

That is, even in case where the deformation of the support plate portion 7 forming the trunnion 6 can be prevented perfectly (that is, the support plate portion 7 can be perfectly prevented against deformation), it is inevitable that the outer race 28, which is disposed opposed to the inner surface of the support plate portion 7 and forms the thrust ball bearing 24, is elastically deformed unevenly with respect to the circumferential direction thereof. The reason for this is as follows. That is, when the toroidal-type continuously variable transmission is in operation, to the power rollers 11 which respectively function as the inner races of the thrust ball bearing 24, there are applied large thrust and radial loads at and from the two diameter-direction mutually opposite positions of the portions of the power rollers 11 that are their contact portions with respect to the inner surfaces 2a, 4a of the input side and output side disks 2, 4. For this reason, the thrust loads, which are applied from the power rollers 11 to the plurality of balls 26, 26 forming the thrust ball bearing 24, are made uneven with respect to the circumferential direction thereof.

On the other hand, the thickness of the outer race 28 in the axial direction thereof cannot be increased so much when it is desired to reduce the weight of the outer race 28. Therefore, when the toroidal-type continuously variable transmission is in operation, the outer race 28 tends to be elastically deformed unevenly with respect to the circumferential direction thereof. As a result of this, depending on the rigidity of the support plate portion 7, there is a fear that the contact pressure between the rolling surfaces of the specific balls 26, 26 and their mating raceways can be increased excessively. Description will be given below of this fear with reference to FIG. 2. By the way, FIGS. 2A to 2D typically show the relation between the support plate portion 7 of the trunnion 6 and the outer race 28 forming the thrust ball bearing 24, while there is omitted therefrom the thrust needle roller bearing 25 (FIGS. 6 and 7) existing between these two members 7 and 28.

Figure 2A:
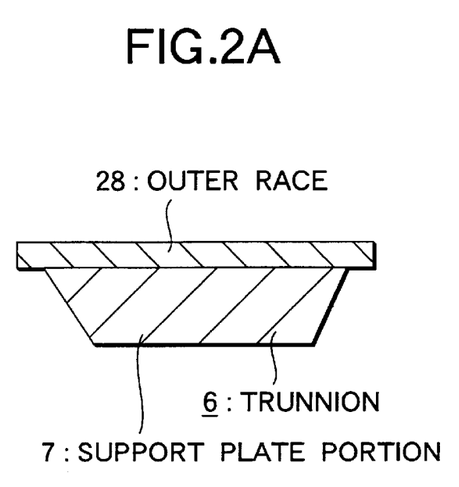
FIGS. 2A, B, C, and D are respectively section views thereof taken from the same direction as FIG. 1B.

In a state where, since no thrust load is applied to the power roller 11 or a thrust load is applied evenly to the power roller 11 with respect to the circumferential direction thereof, neither the support plate portion 7 nor the outer race 28 is deformed, as shown in FIG. 2A, the inner surface of the support plate portion 7 and the outer surface of the outer race 28 are parallel to each other. On the other hand, in case where the thrust loads applied from the power roller 11 to the balls 26, 26 are uneven with respect to the circumferential direction thereof, the outer race 28 is elastically deformed in such a manner as shown in FIG. 2B, 2C, or 2D.

Figure 2B:
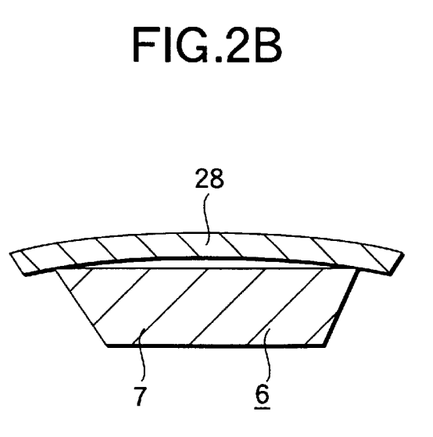

When the outer race 28 is elastically deformed in this manner, in case where the rigidity of the support plate portion 7 is high, as shown in FIG. 2(B), there is a tendency that only the outer race 28 is elastically deformed but the support plate portion 7 is not elastically deformed, or that the elastic deformation amount of the support plate portion 7 is quite small when compared with the that of the outer race 28. In this case, the surface pressure of the contact portion between the inner race raceway formed on the outer surface of the power roller 11 and the outer race raceway formed on the inner surface of the outer race 28 becomes excessively high in part, which raises a fear that the rolling fatigue lives of the rolling surfaces as well as the raceways to be contacted therewith can be degraded greatly.

Figure 2C:
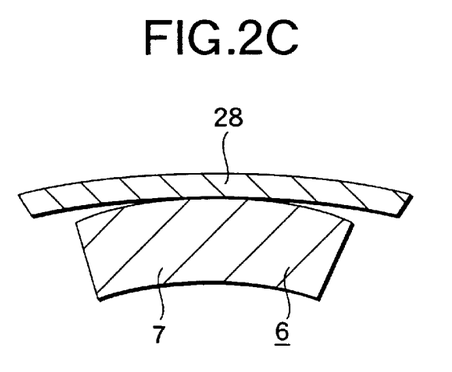
Figure 2D:
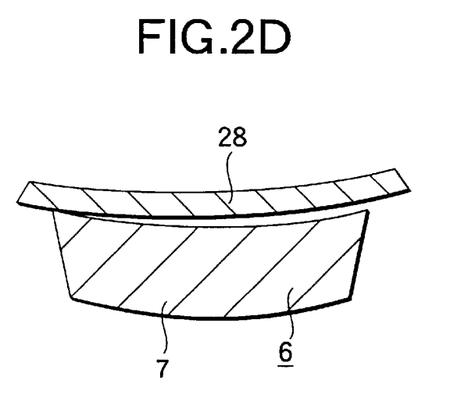

In case where the thrust loads applied from the power roller 11 to the balls 26, 26 are uneven in the circumferential direction thereof, in order to make even the surface pressure of the contact portion between the rolling surfaces of the balls 26, 26 and their associated raceways to thereby secure the desired rolling fatigue lives of the rolling surfaces and raceways, it can be expected to employ a technique in which, as shown in FIG. 2C or 2D, the support plate portion 7 and outer race 28 are both elastically deformed. For example, when the thrust load applied to the outer race 28 is large in the two side portions of the support plate portion 7 in the width direction thereof (in FIG. 2, in the right and left direction) and is small in the central portion thereof, by reducing the rigidity of the support plate portion 7 in the width-direction two side portions thereof to thereby deform elastically the support plate portion 7 to the outer race 28 in such a manner as shown in FIG. 2C, the above-mentioned rolling fatigue lives can be secured. Also, when the thrust load applied to the outer race 28 is large in the central portions of the support plate portion 7 in the width direction thereof and is small in the width-direction two end portions thereof, by reducing the rigidity of the support plate portion 7 in the width-direction central portion thereof to thereby deform elastically the support plate portion 7 to the outer race 28 in such a manner as shown in FIG. 2D, the above-mentioned rolling fatigue lives can be secured.

Further, the above-mentioned elastic deformation of the support plate portion 7 and outer race 28 must be checked not only in the width direction of the support plate portion 7 but also in the longitudinal direction thereof. That is, when the toroidal-type continuously variable transmission is in operation, the support plate portion 7, as shown by a chained line in the FIG. 5 that has been discussed before, is deformed elastically in a direction where the longitudinal-direction central portion of the inner surface of the support plate portion 7 provides a concave-shaped surface. Therefore, in order to be able to make even the surface pressures of the contact portions between the rolling surfaces of the balls 26, 26 and their associated raceways, the elastic deformation of the support plate portion 7 in the longitudinal direction thereof must also be taken into account.

SUMMARY OF THE INVENTION

The present invention aims at eliminating the drawbacks found in the above-mentioned conventional toroidal-type continuously variable transmissions. Accordingly, it is an object of the invention to provide a toroidal-type continuously variable transmission in which the relation between the section shape of a support plate portion forming a trunnion and the length thereof is specified, and the support plate portion is elastically deformed in a proper manner to thereby make as even as possible the surface pressures of the contact portions between the rolling surfaces of the respective balls 26, 26 forming the thrust ball bearing 24 and their associated raceways.

In attaining the above object, according to the invention, there is provided a toroidal-type continuously variable transmission, comprising: first and second disks supported rotatably and concentrically with each other, with their respective inner surfaces disposed opposed to each other; trunnions respectively swingable about their associated pivot shafts respectively disposed at positions which is twisted with respect to the center axes of the first and second disks; shift shafts respectively supported in the intermediate portions of support plate portions respectively forming their associated trunnions in such a manner that they respectively project from the respective inner surfaces of the support plate portions; power rollers respectively held by and between the first and second disks in such a manner that they are rotatably supported on the peripheries of their associated shift shafts; and, thrust rolling bearings respectively disposed on the outer surfaces of their associated power rollers for permitting the power rollers to rotate while supporting thrust-direction loads applied to the power rollers.

Also, each of the trunnions is structured in the following manner: that is, a pair of bent wall portions are respectively formed in the longitudinal-direction two end portions of the support plate portion in such a manner that they are bent toward the inner surface side of the support plate portion; and, the pivot shafts are respectively disposed on the outer surfaces of the pair of bent wall portions in such a manner that they are concentric with each other.

Especially, in the toroidal-type continuously variable transmission according to the invention, the section area of the support plate portion is expressed as S, the length of the portion of the support plate portion that exists between the respective inner surfaces of the pair of bent wall portions is expressed as L, and the section coefficient of the support plate portion is expressed as Z, the ratio (S×L)/Z is specified in the range of 10–35 (more preferably, in the range of 15–30).

In the case of the above-structured toroidal-type continuously variable transmission according to the invention, due to the operation thereof which is similar to that of the previously described conventional toroidal-type continuously variable transmission, the rotational force can be transmitted between the first and second disks and also the ratio of the rotation speeds of the two disks can be adjusted.

Especially, according to a main aspect of the toroidal-type continuously variable transmission according to the invention, the ratio (S×L)/Z of the product S×L of the section area S of the support plate portion forming its associated trunnion and the length L of the support plate portion to the section coefficient Z of the support plate portion is specified in the proper range, thereby being able to secure the rolling fatigue lives of the component members of the thrust rolling bearing which is used to allow the rotational movement of the power roller.

That is, in the case of the toroidal-type continuously variable transmission according to the invention, by specifying the ratio (S×L)/Z in the range of 10–35 (more preferably, in the range of 15–30), the support plate portion can be elastically deformed according to the thrust load that is applied to the outer race forming the thrust rolling bearing. This can prevent the respective rolling bodies from varying greatly from each other in the surface pressure of the contact portion thereof with respect to the inner race raceway formed on the outer surface of the power roller and the outer race raceway formed on the inner surface of the outer race. This makes it possible to secure the rolling fatigue lives of the respective rolling bodies as well as the inner race raceway and outer race raceway.

In addition, a section of the support plate portion in a width direction, is bent in a concave manner so that end portions in the width direction are bent away from an inner surface side of the support plate portion. Therefore, the durability of the thrust ball bearing 24 can be secured sufficiently.

BRIEF DESCRIPTION OF THE DRAWINGS

FIGS. 1A and 1B show the basic structure of a trunnion; specifically,

FIGS. 2A to 2D are section views of the trunnion; specifically,

DETAILED DESCRIPTION OF THE PREFERED EMBODIMENT

Now, description will be given below of the test that has been conducted by the present inventors in order to confirm the effects of the present invention. By the way, in the invention, the shape and dimension of the support plate portion 7 forming the trunnion 6 to be incorporated into a toroidal-type continuously variable transmission are improved to thereby be able to secure the rolling fatigue lives of the component members of the thrust ball bearing 24 (see FIGS. 6 and 7) interposed between the inner surface of the support plate portion 7 and power roller 11. The structures and operations of the other remaining portions of the invention are similar to the conventional structures including, for example, the structure shown in the above-mentioned FIGS. 6 and 7. Therefore, the duplicate illustration and description thereof are omitted here and thus description will be given below mainly of the characteristic portions of the-invention.

Figure 1A:
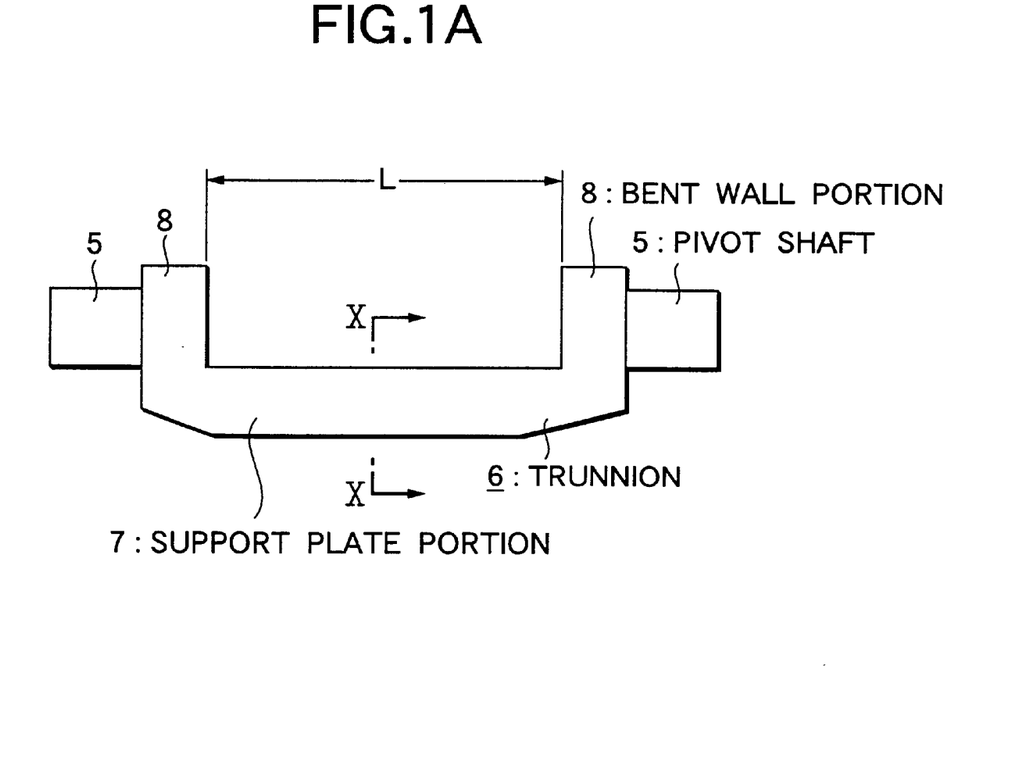
FIG. 1A is substantially a side view thereof.
Figure 1B:
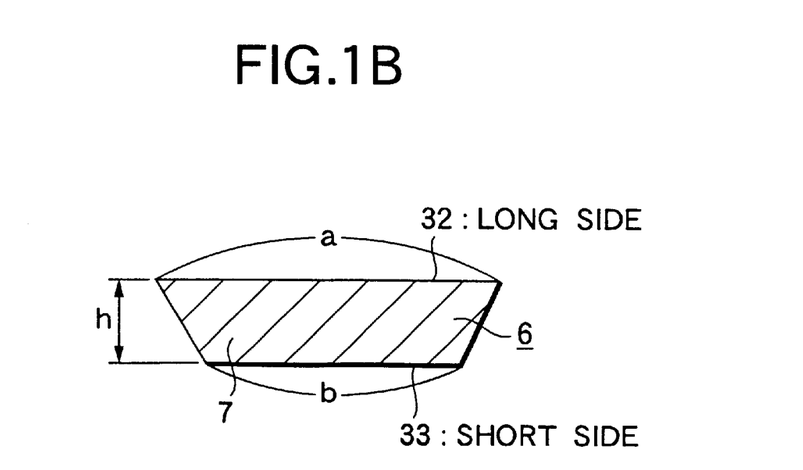
FIG. 1B is a section view thereof, taken along the line X—X shown in FIG. 1A.

Referring now to the structure of the trunnion 6 to be used in the above test, as shown in FIG. 1A, in the two end portions of the support plate portion 7 in the longitudinal direction thereof (in FIG. 1A, in the right and left direction), there are formed a pair of bent wall portions 8, 8 in such a manner that they are respectively bent toward the inner surface side (in FIG. 1A, the upper side) of the support plate portion 7. And, on the respective outer surfaces of the two bent wall portions 8, 8, there are disposed pivot shafts 5, 5 in such a manner that they are concentric with each other. Also, the shape of the section of the support plate portion 7 is formed as an isosceles trapezoid in which its inner surface side (in FIG. 1B, upper side) is a long side 32 having a length a, its outer surface side (in FIG. 1B, lower side) is a short side 33 having a length b, and its height is h. In the test, the length a of the long side 32 of the isosceles trapezoid, the length b of the short side 33 thereof, the height h thereof, and the length L (in FIG. 1A) of the support plate portion itself were combined together in such various manners as shown in the following table 1; for each of such combinations, the trunnion 6 was incorporated into a toroidal-type continuously variable transmission of a so called single cavity type which, as shown in FIGS. 6 and 7, includes a single input side disk 2 and a single output side disk 4; and, the durability of the thrust ball bearing 24 was checked.

TABLE 1

|  |  | a (mm) | b (mm) | h (mm) | L (mm) |
|---|---|---|---|---|---|
| Embodiments | 1 | 60 | 30 | 15 | 70 |
|  | 2 | 60 | 40 | 20 | 80 |
|  | 3 | 60 | 50 | 30 | 80 |
|  | 4 | 80 | 40 | 30 | 90 |
|  | 5 | 80 | 50 | 30 | 170 |
|  | 6 | 80 | 70 | 60 | 100 |
| Comparison Examples | 1 | 60 | 40 | 10 | 80 |
|  | 2 | 60 | 40 | 50 | 80 |
|  | 3 | 80 | 50 | 30 | 180 |
|  | 4 | 80 | 70 | 60 | 90 |

In case where, under the conditions that are shown in Table 1, the section area S of the support plate portion 7, a section secondary moment Ix around the center of gravity, the position of the center of gravity e, a section coefficient Z, and the ratio (S×L)/Z of the product S×L of the section area S and length L to the section coefficient Z are calculated respectively, there are obtained such numeric values as shown in Table 2.

TABLE 2

|  |  | S (mm$^2$) | Ix (mm$^4$) | e (mm) | z = (Ix/e) mm$^3$ | S × L/Z |
|---|---|---|---|---|---|---|
| Embodiments | 1 | 675 | 12187.5 | 7.5 | 1625 | 29.1 |
|  | 2 | 1000 | 32888.9 | 10 | 3288.9 | 24.3 |
|  | 3 | 1650 | 123409 | 15 | 8227.3 | 16.0 |
|  | 4 | 1800 | 130000 | 15 | 8666.7 | 18.7 |
|  | 5 | 1950 | 143654 | 15 | 9576.9 | 34.6 |
|  | 6 | 4500 | 1348000 | 30 | 44933.3 | 10.0 |
| Comparison Examples | 1 | 500 | 4111.1 | 5 | 822.22 | 48.6 |
|  | 2 | 2500 | 513889 | 25 | 20555.56 | 9.7 |
|  | 3 | 1950 | 143654 | 15 | 9576.9 | 36.7 |
|  | 4 | 4500 | 1348000 | 30 | 44933.3 | 9.0 |

The test conditions are as follows:

Rotation speed of the input shaft 18: 4000 min$^{-1}$ (r.p.m.)

| Input torque | 370 N m ($\approx$ 3.7.8 kg m) |
|---|---|
| Oil used | Synthetic lubricating oil |
| Oil temperature | 100°. |

By the way, these test conditions, from the viewpoint of the input torque, are too severe for a toroidal-type continuously variable transmission of a single cavity type, while these conditions rather correspond to an acceleration test. That is, a toroidal-type continuously variable transmission used to transmit such large torque as mentioned above is generally a toroidal-type continuously variable transmission of a double cavity type in which input side and output side disks are arranged by twos each and in parallel to each other in the power transmission direction.

Results obtained in the test that was conducted in these conditions are shown in the next table 3. By the way, the test was completed at the time of the passage of one hundred hours. In Table 3, the life time of 100 hours or more shows that no damage was found in the component members of the thrust ball bearing 24 at the test end time. Also, the term "outer race flaking" shows that a flaking phenomenon occurred in an outer race raceway formed on the inner surface of an outer race 28 forming the thrust ball bearing 24. Further, reference characters B to D, which are used to express the deformed states of the outer race 28, show that the elastically deformed state of the outer race 28 and the support plate portion 7 of the trunnion 6 corresponds to any one of the states shown in the above-mentioned FIGS. 2B to 2D.

TABLE 3

|  |  | Deformation Amount of Trunnion 6 | Deformed State of Outer Race 28 | Life Time (hr) | Presence or Absence of Damage in Thrust Ball Bearing 24 |
|---|---|---|---|---|---|
| Embodiments | 1 | middle | C | 100 hrs. or more | Absence |
|  | 2 | middle | C | 100 hrs. or more | Absence |

TABLE 3-continued

|  |  | Deformation Amount of Trunnion 6 | Deformed State of Outer Race 28 | Life Time (hr) | Presence or Absence of Damage in Thrust Ball Bearing 24 |
|---|---|---|---|---|---|
|  | 3 | middle | C | 100 hrs. or more | Absence |
|  | 4 | middle | C | 100 hrs. or more | Absence |
|  | 5 | middle | D | 71 | Outer Race flaking |
|  | 6 | middle | B | 84 | Outer Race flaking |
| Comparison Examples | 1 | Large (5 mm or more) | D | 8 | Outer Race flaking |
|  | 2 | Small (1 mm or less) | B | 23 | Outer Race flaking |
|  | 3 | Large (5 mm or more) | D | 12 | Outer Race flaking |
|  | 4 | Small (1 mm or less) | B | 19 | Outer Race flaking |

Table 3 shows the results of the test conducted under the above conditions and, from Table 3, there can be found the following facts.

Firstly, in the embodiments 1 to 4 which respectively belong to the invention and in which the ratio (S×L)/Z of the product S×L of the section area S and the length L to the section coefficient Z is in the range of 16.0–29.1, the support plate portion 7 of the trunnion 6 backing up the outer race 28 forming the thrust ball bearing 24, as shown in FIG. 2C, is deformed in the same direction as the direction of the elastic deformation of the power roller 11 that occurs when a toroidal-type continuously variable transmission is in operation. And, the load distribution of the plurality of balls 26, 26 forming the thrust ball bearing 24 becomes almost even, which can prevent occurrence of an excessive load in any specific one of the balls 26, 26. As a result of this, in all of the embodiments 1 to 4, even at the time of the passage of 100 hours, no flaking occurred. This shows that, in case where the above ratio (S×L)/Z is set in the range of 15–30, the durability of the thrust ball bearing 24 can be secured sufficiently.

Next, in the embodiment 5 in which the length of the support plate portion 7 of the trunnion 6 is long and the ratio of the product S×L of the section area S and length L to the section coefficient Z is slightly larger (34.6), as shown in FIG. 2D, there is a tendency that the support plate portion 7 of the trunnion 6 is deformed. This causes a tendency that the outer race 28 forming the thrust ball bearing 24 is also deformed elastically in the same direction, which makes slightly uneven the load distribution of the plurality of balls 26, 26 forming the thrust ball bearing 24. As a result of this, at the time of the passage of 71 hours, a flaking phenomenon occurred in the outer race raceway formed on the inner surface of the outer race 28.

Also, in the embodiment 6, since the rigidity of the support plate portion 7 of the trunnion 6 is enhanced, the ratio (S×L)/Z of the product S×L of the section area S and length L to the section coefficient Z is reduced slightly (10.0) and thus, as shown in FIG. 2B, there is found a tendency that only the outer race 28 forming the thrust ball bearing 24 is elastically deformed. However, in this case as well, the support plate portion 7 is elastically deformed to a slight degree. Therefore, the load distribution of the plurality of balls 26, 26 forming the thrust ball bearing 24 becomes rather uneven. As a result of this, at the time of 84 hours, there occurred a flaking phenomenon in the outer race raceway that is formed on the inner surface of the outer race 28.

However, in the embodiments 5 and 6, when compared with the comparison examples 1 to 4 that will be discussed below, the life of the thrust ball bearing 24 is enhanced three times or more. This shows that, in case where the above ratio (S×L)/Z is specified in the range of 10–35, the life of the thrust ball bearing 24 can be extended over the conventional thrust ball bearing 24.

On the other hand, in the case of the comparison examples 1 and 3 in which the ratio (S×L)/Z of the product S×L of the section area S and length L to the section coefficient Z is large, specifically, 48.6 and 36.7, the support plate portion 7 forming the trunnion 6, as shown in FIG. 2D, is easy to deform elastically in a direction where the width-direction central portion of the inner surface of the support plate portion 7 provides a concave-shaped surface and the elastic deformation amount thereof is large. This raises a tendency that the outer race 28 forming the thrust ball bearing 24 is also elastically deformed greatly in the same direction and thus the load distribution of the plurality of balls 26, 26 forming the thrust ball bearing 24 becomes outstandingly uneven. As a result of this, at the times of 8 hours and 12 hours, there occurred flaking phenomena in the outer race raceway that is formed on the inner surface of the outer race 28.

Further, in the case of the comparison examples 2 and 4 in which the ratio (S×L)/Z of the product S×L of the section area S and length L to the section coefficient Z is small, specifically, 9.7 and 9.0, since the rigidity of the support plate portion 7 forming the trunnion 6 is high, the support plate portion 7 is little deformed. Therefore, when a toroidal-type continuously variable transmission is in operation, in case where the outer race 28 forming the thrust ball bearing 24 is elastically deformed in such a manner as shown in FIG. 2B due to the thrust loads caused by the loads that are applied to the two diameter-direction opposite side positions of the power roller 11, the load distribution of the plurality of balls 26, 26 forming the thrust ball bearing 24 becomes outstandingly uneven. As a result of this, at the times of 23 hours and 19 hours, there occurred flaking phenomena in the outer race raceway that is formed on the inner surface of the outer race 28.

As can be seen clearly from the foregoing results, by specifying the ratio (S×L)/Z of the product S×L of the section area S and length L to the section coefficient Z in the range of 10–35, more preferably, in the range of 15–30, there can be obtained a trunnion 6 which has a sufficient section coefficient and has large bending rigidity while it is relatively light in weight. And, by elastically deforming the trunnion 6 in a proper manner, the load distribution of the balls 26, 26 forming the thrust ball bearing 24, which is used to support the power roller 11, can be made even. Thus, the durability of the thrust ball bearing 24 can be enhanced.

Since a toroidal-type continuously variable transmission according to the invention is structured and can be operated in the above-mentioned manner, according to the invention, there can be realized a toroidal-type continuously variable transmission which is light in weight and excellent in durability.

What is claimed is:

1. A toroidal-type continuously variable transmission comprising:
   first and second disks supported concentrically with each other and rotatably, with their respective inner surfaces disposed opposed to each other;

trunnions respectively swingable about associated pivot shafts disposed at positions twisted with respect to the center axes of said first and second disks;

shift shafts respectively supported by intermediate portions of support plate portions respectively forming said trunnions in such a manner that said shift shafts respectively project from associated inner surfaces of said support plate portions;

power rollers respectively held by and between said first and second disks in such a manner that said power rollers are rotatably supported on peripheries of said shift shafts;

thrust rolling bearings attachedly disposed on the outer surfaces of said power rollers for permitting said power rollers to rotate while supporting thrust-direction loads applied to said power rollers; and a pair of bent wall portions formed respectively in the longitudinal-direction of two end portions of one of said support plate portions in such a manner that said bent wall portions are bent toward the inner surface of said one of said support plate portions, and said pivot shafts are respectively disposed on outer surfaces of said pair of bent wall portions in such a manner that they are concentric with each other, wherein a section area of said one of said support plate portions is expressed as S, the length of said one of said support plate portions that exists between the respective inner surfaces of said pair of bent wall portions is expressed as L, and the section coefficient of said one of said support plate portions is expressed as Z, a ratio (S×L)/Z is specified in the range of 10–35.

2. The toroidal-type continuously variable transmission according to claim 1, wherein said ratio (S×L)/Z is specified in the range of 15–30.

3. The toroidal-type continuously variable transmission according to claim 1, wherein a section of said one of said support plate portions in a width direction, is bent in a convex manner so that end portions in the width direction are bent away from the inner surface of said one of said support plate portions.

4. The toroidal-type continuously variable transmission according to claim 2, wherein a section of said one of said support plate portions in a width direction, is bent in a convex manner so that end portions in the width direction are bent away from the inner surface side of said one of said support plate portions.

* * * * *